United States Patent Office 3,303,238
Patented Feb. 7, 1967

3,303,238
UNSATURATED HYDROCARBONS BY OXIDATIVE DEHYDROGENATION OVER SILICA-PROMOTED FERRITE CATALYST
Harold F. Christmann, Houston, Tex., assignor to Petro-Tex Chemical Corporation, Houston, Tex., a corporation of Delaware
No Drawing. Filed June 22, 1964, Ser. No. 377,103
6 Claims. (Cl. 260—680)

This invention relates to a process for the dehydrogenation of organic compounds and relates more particularly to the dehydrogenation of organic compounds at elevated temperatures in the presence of oxygen and particular catalysts.

In copending applications it has been disclosed that an improved process for the dehydrogenation of organic compounds is provided by contacting the organic compound at an elevated temperature with oxygen in the presence of certain catalysts containing iron, and at least one of a certain group of metals. Although excellent results are obtained with the catalysts of the copending applications, it is an object of this invention to provide further improved catalysts. One of the principal objects of this invention is to improve the life of the catalyst. Still other objects are to increase the conversion, selectivity and yield of the catalyst.

The catalysts of this invention comprise iron, silicon and as a third component at least one metal selected from the group consisting of magnesium, zinc, cobalt, nickel, and mixtures thereof. The silicon should be present in an amount of from or about .003 to 0.30 atom of silicon per atom of iron in the catalyst, and preferably will be between about .004 and 0.20 atom of silicon per atom of iron. The total number of atoms selected from the group consisting of magnesium, zinc, cobalt and nickel should be from about .05 to 2.0 total atoms per atom of iron and preferably will be from or about .20 to 1.0 total atom per atom of iron, with a particularly preferred ratio of .35 to .6 total atom per atom of iron. The atoms of silicon will generally be present in an amount from or about 0.25 to 15 weight percent silicon, based on the total weight of the atoms of iron, magnesium, zinc, cobalt, nickel and combinations thereof.

The catalyst will also contain oxygen, but the ratio of oxygen to the remaining atoms is variable. The ratio of oxygen to iron will generally be within the range of about 0.5 to 10 atoms of oxygen per atom of iron, but this ratio may be somewhat higher or lower.

One of the principal benefits obtained by the incorporation of silicon in the catalyst is the increased life of the catalyst. Although the catalyst described above containing iron and at least one metal selected from the group consisting of magnesium, zinc, cobalt, nickel and mixtures or combinations thereof produce high yields of unsaturated product, frequently these catalysts do not have as long a catalyst life as is desired. It has been found that the presence of silicon in critical amounts in the catalyst stabilizes the catalyst. The high initial yields obtained with the modified catalyst are maintained for prolonged periods of time, and the silicon modified catalyst has improved physical characteristics, such as attrition resistance.

Especially preferred as iron catalysts to be modified according to the present invention are the ferrites. The ferrites are known commercial products with numerous uses such as for high temperature pigments. The ferrites comprise iron combined in a crystalline structure with at least one other metal and oxygen. The ferrite structure may be determined by X-ray diffraction. Quite often the ferrites will exhibit electrical semi-conductivity and may be magnetic. Examples of ferrites to be modified according to this invention are magnesium ferrite, zinc ferrite, cobalt ferrite and nickel ferrite, iron-magnesium-zinc ferrite, iron - magnesium - nickel ferrite, iron-magnesium-cobalt ferrite, iron-zinc-nickel ferrite, and iron-zinc-cobalt ferrite.

Although organic compounds generally may be dehydrogenated with the process of this invention, the invention is most advantageously used for the dehydrogenation of hydrocarbons. Hydrocarbons to be dehydrogenated according to the process of this invention are hydrocarbons of 4 to 7 carbon atoms and preferably are aliphatic hydrocarbons selected from the group consisting of saturated hydrocarbons, monoolefins, diolefins and mixtures thereof of 4 to 5 or 6 carbon atoms having a straight chain of at least four carbon atoms and cycloaliphatics. Examples of preferred feed materials are butene-1, cis-butene-2, trans-butene-2, 2-methylbutene-1, 2-methylbutene-2, 2-methylbutene-3, n-butane, butadiene-1,3, methyl butane, 2-methylpentene-1, cyclohexene, 2-methylpentene-2 and mixtures thereof. For example, n-butane may be converted to a mixture of butene-1 and butene-2 or may be converted to a mixture of butene-1, butene-2 and/or butadiene-1,3. A mixture of n-butane and butene-2 may be converted to butadiene-1,3 or to a mixture of butadiene-1,3 together with some butene-2 and butene-1. Vinyl acetylene may be present as a product, particularly when butadiene-1,3 is used as a feedstock. Particularly preferred products are butadiene-1,3 and isoprene. Useful feeds may be mixed hydrocarbon streams such as refinery streams, or the olefin containing hydrocarbon mixture obtained as the product from the dehydrogenation of hydrocarbons. In the production of gasoline from higher hydrocarbons by either thermal or catalytic cracking a hydrocarbon stream containing predominantly hydrocarbons of 4 carbon atoms may be produced and may comprise a mixture of butenes together with butadiene, butane, isobutane, isobutylene and other ingredients in minor amounts. These and other refinery by-products which contain normal, ethylenically unsaturated hydrocarbons are useful as starting materials. Although various mixtures of hydrocarbons are useful, the preferred hydrocarbon feed contains at least 50 weight percent of a hydrocarbon selected from the group consisting of butene-1, butene-2, n-butane, butadiene-1,3, 2-methylbutene-1, 2-methylbutene-2, 2-methylbutene-3 and mixtures thereof, and more preferably contains at least 70 weight percent of one or more of these hydrocarbons (with both of these percentages being based on the total weight of the organic composition of the feed to the reactor). Any remainder may be, for example, essentially aliphatic hydrocarbons. This invention is particularly useful to provide a process whereby the major product of the hydrocarbon converted is a dehydrogenated hydrocarbon product having the same number of carbon atoms as the hydrocarbon fed.

Oxygen will be present in the reaction zone in an amount within the range of 0.2 to 2.5 mols of oxygen per mol of hydrocarbon to be dehydrogenated. Generally, better results may be obtained if the oxygen concentration is maintained between about 0.25 and about 1.6 mols of oxygen per mol of hydrocarbon to be dehydrogenated, such as between 0.35 and 1.2 mols of oxygen. The oxygen may be fed to the reactor as pure oxygen, as air, as oxygen-enriched air, oxygen mixed with diluents and so forth. Based on the total gaseous mixture entering the reactor, the oxygen ordinarily will be present in an amount from about 0.5 to 25 volume percent of the total gaseous mixture, and more usually will be present in an amount from about 1 to 15 volume percent of the total. The total amount of oxygen utilized may be introduced into the gaseous mixture entering the catalytic zone or sometimes it has been found desirable to add the oxygen in increments, such as to different sections of the reactor. The oxygen may be added directly to the reactor or it may be premixed, for example, with a diluent or steam.

The temperature for the dehydrogenation reaction will be greater than 250° C., such as greater than about 300° C. or 375° C. Excellent results are obtained within the range of 300° C. to 625° C., and preferably from or about 325° C. to or about 550° C. The temperatures are measured at the maximum temperature in the reactor. An advantage of this invention is that lower temperatures of dehydrogenation may be utilized than are possible in conventional dehydrogenation processes. Another advantage is that large quantities of heat do not have to be added to the reaction as was previously required.

The dehydrogenation reaction may be carried out at atmospheric pressure, superatmospheric pressure or at subatmospheric pressure. The total pressure of the system will normally be about or in excess of atmospheric pressure, although sub-atmospheric pressure may also desirably be used. Generally, the total pressure will be between about 4 p.s.i.a. and about 100 or 125 p.s.i.a. Preferably the total pressure will be less than about 75 p.s.i.a. and excellent results are obtained at about atmospheric pressure.

The initial partial pressure of the hydrocarbon to be dehydrogenated will preferably be equivalent to less than one-half atmosphere at a total pressure of one atmosphere. Generally the combined partial pressure of the hydrocarbon to be dehydrogenated together with the oxygen will also be equivalent to less than one-half atmosphere at a total pressure of one atmosphere. Preferably, the initial partial pressure of the hydrocarbon to be dehydrogenated will be equivalent to no greater than one-third atmosphere or no greater than one-fifth atmosphere at a total pressure of one atmosphere. Also, preferably the initial partial pressure of the combined hydrocarbon to be dehydrogenated plus the oxygen will be equivalent to no greater than one-third or no greater than one-fifth atmosphere at a total pressure of one atmosphere. Reference to the initial partial pressure of the hydrocarbon to be dehydrogenated means the partial pressure of the hydrocarbon as it first contacts the catalytic particles. An equivalent partial pressure at a total pressure of one atmosphere means that one atmosphere total pressure is a reference point and does not imply that the total pressure of the reaction must be operated at atmospheric pressure. For example, in a mixture of one mol of butene, three mols of steam, and one mol of oxygen under a total pressure of one atmosphere, the butene would have an absolute pressure of one-fifth of the total pressure, or roughly six inches of mercury absolute pressure. Equivalent to this six inches of mercury butene absolute pressure at atmospheric pressure would be butene mixed with oxygen under a vacuum such that the partial pressure of the butene is 6 inches of mercury absolute. The combination of a diluent such as nitrogen, together with the use of a vacuum may be utilized to achieve the desired partial pressure of the hydrocarbon. For the purpose of this invention, also equivalent to the six inches of mercury butene absolute pressure at atmospheric pressure would be the same mixture of one mol of butene, three mols of steam and one mol of oxygen under a total pressure greater than atmospheric, for example, a total pressure of 20 p.s.i.a. Thus, when the total pressure in the reaction zone is greater than one atmosphere, the absolute values for the pressure of the hydrocarbon to be dehydrogenated will be increased in direct proportion to the increase in total pressure above one atmosphere.

The partial pressures described above may be maintained by the use of diluents such as nitrogen, helium or other gases. Conveniently, the oxygen may be added as air with the nitrogen acting as a diluent for the system. Mixtures of diluents may be employed. Volatile compounds which are not dehydrogenated or which are dehydrogenated only to a limited extent may be present as diluents.

Preferably, the reaction mixture contains a quantity of steam, with the range generally being between about 2 and 40 mols of steam per mol of hydrocarbon to be dehydrogenated. Preferably steam will be present in an amount from about 3 to 35 mols per mol of hydrocarbon to be dehydrogenated and excellent results have been obtained within the range of about 5 to about 30 mols of steam per mol of hydrocarbon to be dehydrogenated. The functions of the steam are several-fold, and the steam does not merely act as a diluent. Diluents generally may be used in the same quantities as specified for the steam. Excellent results are obtained when the gaseous composition fed to the reactor consists essentially of hydrocarbons, inert diluents and oxygen as the sole oxidizing agent.

The gaseous reactants may be conducted through the reaction chamber at a fairly wide range of flow rates. The optimum flow rate will be dependent upon such variables as the temperature of reaction, pressure, particle size, and whether a fluid bed or fixed bed reactor is utilized. Desirable flow rates may be established by one skilled in the art. Generally, the flow rates will be within the range of about 0.10 to 25 liquid volumes of the hydrocarbon to be dehydrogenated per volume of reactor containing catalyst per hour (referred to as LHSV), wherein the volumes of hydrocarbon are calculated at standard conditions of 25° C. and 760 mm. of mercury. Usually, the LHSV will be between 0.15 and about 5 or 10. For calculation, the volume of reactor containing catalyst is that volume of reactor space excluding the volume displaced by the catalyst. For example, if a reactor has a particular volume of cubic feet of void space, when that void space is filled with catalyst particles, the original void space is the volume of reactor containing catalyst for the purpose of calculating the flow rate. The gaseous hourly space velocity (GHSV) is the volume of the hydrocarbon to be dehydrogenated in the form of vapor calculated under standard conditions of 25° C. and 760 mm. of mercury per volume of reactor space containing catalyst per hour. Generally, the GHSV will be between about 25 and 6400, and excellent results have been obtained between about 38 and 3800. Suitable contact times are, for example, from about 0.001 or higher to about 5 or 10 seconds, with particularly good results being obtained between 0.01 and 3 seconds. The contact time is the calculated dwell time of the reaction mixture in the reaction zone, assuming the mols of product mixture are equivalent to the mols of feed mixture. For the purpose of calculation of residence times, the reaction zone is the portion of the reactor containing catalyst.

The catalytic surface described is the surface which is exposed in the dehydrogenation zone to the reactor, that is, if a catalyst carrier is used, the composition described as a catalyst refers to the composition of the surface and not to the total composition of the surface coating plus carrier. The iron, silicon and at least one metal from the group consisting of magnesium, zinc, cobalt and nickel will be present as an intimate combination of the ingredients. Catalyst binding agents or fillers may be used, but these will not ordinarily exceed about 50 percent or 60 percent by weight of the catalytic surface. These binding agents and fillers will preferably be essentially inert. The quantity of catalyst utilized will be dependent upon such variables as the temperature of reaction, the concentration of oxygen, the age of the catalyst, and the flow rates of the reactants. The catalyst will by definition be present in a catalytic amount and generally the ferrite together with any atoms not combined as the defined ferrite will be the main active constituents. The amount of catalyst will ordinarily be present in an amount greater than 10 square feet of catalyst surface per cubic foot of reaction zone containing catalyst. Of course, the amount of catalyst may be much greater, particularly when irregular surface catalysts are used. When the catalyst is in the form of particles, either supported or unsupported, the amount of catalyst surface may be expressed in terms of the surface area per unit weight of any particular volume of catalyst particles. The ratio of catalytic surface to weight will be dependent upon various factors, including the particle size, particle size distribution, apparent bulk density of the particles, amount of active catalyst coated on the carrier, density of the carrier, and so forth. Typical values for the surface to weight ratio are such as about one-half to 200 square meters per gram, although higher and lower values may be used. The catalyst is autoregenerative and the process is continuous.

The catalysts may be prepared in a number of ways. The catalytic composition may be extruded into catalytic particles, compressed from dry ingredients, coated on a carrier and so forth. The iron, silicon and at least one metal from the group consisting of magnesium, zinc, nickel and cobalt may be incorporated using starting compounds such as oxides, nitrates, hydroxides, hydrates, oxalates, carbonates, acetates, halides and so forth. Excellent catalysts are obtained by using salts of the elements. The catalysts of this invention will be used in the form of inorganic oxides for the dehydrogenation reaction. This definition means that the catalysts are inorganic and contain oxygen; included in this definition are the ferrites. However, as pointed out, the catalysts may be produced from organic precursors such as the acetates or oxalates.

The silicon may be added at any stage of the catalyst preparation, but it generally will be added in such amount that intimate mixing with the other ingredients is insured. One suitable method of preparation is to add the silicon in the form of silica, $SiO_2$. Silica may be incorporated in the catalyst, for example, by the acid hydrolysis of an organic or inorganic silicate, such as tetraethyl ortho silicate or sodium silicate. The resulting hydrogel may be slurred with the other catalytic ingredients. If the starting material is a silicate salt such as sodium silicate ordinarily the solution formed by acid hydrolysis will be filtered and washed to remove extraneous ions before combining with the other catalytic compositions. Another method of preparation is to mix a silicate, ferrite or ferrite precursors in aqueous media whereby the silicate hydrolyzes in the presence of the other components of the catalyst. The silicon may also be added as finely ground and dried silica which may be added to the other components of the catalyst. Regardless of the method of preparation the silicon should be present in an intimate combination with the other catalytic components such as iron and at least one metal selected from the group consisting of magnesium, zinc, cobalt and nickel.

If a carrier is utilized, the amount of catalytic composition on the carrier will generally be within the range of about 5 to 75 weight percent of the total weight of the active catalytic material plus the carrier. Conventional carriers may be employed such as the aluminas, pumice, silicon carbide and so forth.

The dehydrogenation reactor may be of the fixed bed or fluid bed type. Conventional reactors for the production of unsaturated hydrocarbons are satisfactory. Excellent results have been obtained by packing the reactor with catalyst particles as the method of introducing the catalytic surface. The catalyst is autoregenerative and the process may be continuous. Moreover, small amounts of tars and polymers are formed as compared to some prior art processes.

The atoms of iron will preferably be present in an amount from about 40 to 90 weight percent, based on the total weight of the atoms of iron and the metals selected from the group consisting of magnesium, zinc, nickel and cobalt in the catalyst surface. Particularly preferred are catalysts having a weight percent of iron from or about 55 to 80 percent by weight iron based on the total weight of atoms of iron and the metals selected from the group consisting of magnesium, zinc, nickel and cobalt. Valuable catalysts were produced comprising as the main active constituents iron, silicon, and at least one metal selected from the group consisting of magnesium, zinc, nickel and cobalt and oxygen in the catalytic surface exposed to the reaction gases. Particularly preferred are catalysts having a catalytic surface consisting essentially of iron, silicon, oxygen, and at least one element selected from the group consisting of magnesuim, zinc, nickel and cobalt. High yields of product are obtained with catalysts having iron as the predominant metal in the catalytic surface. Preferably, there will be at least 25 weight percent of one or more of the metals magnesium, zinc and/or nickel based on the weight of the atoms of iron. Suitable catalysts may contain less than 5 weight percent sodium and/or potassium based on the weight of the iron, and may contain less than 2 weight percent of these atoms.

Preferably at least about 50 and generally at least about 65 weight percent of the atoms of the iron, magnesium, zinc, nickel and cobalt will be present as a ferrite. Included in the definition of ferrites are the active intermediate oxides and the reduced ferrites. The preferred mixed ferrite has a cubic face-centered crystal structure. Ordinarily, the ferrite will not be present in the most highly oriented crystalline structure, because it has been found that superior results may be obtained with catalysts wherein the ferrite is relatively disordered, that is where there are defects in the crystalline structure. The desired catalyst may be obtained by conducting the reaction to form the active catalyst at relatively low temperatures, that is, at temperatures lower than some of the very high temperatures used for the formation of ferrites prepared for semi-conductor applications. Generally the temperature of reaction for the formation of the catalyst comprising ferrites will be less than 1300° C. and preferably less than 1150° C. Of course, under certain conditions momentary temperatures above these temperatures might also be permissible. The reaction time at the elevated temperature in the formation of the catalyst may preferably be from about five minutes to four hours at elevated temperatures high enough to cause formation of the ferrite but less than about 1150° C. Any iron not present in the form of ferrite will desirably be present predominantly as gamma iron oxide. The alpha iron oxide will preferably be present in an amount of no greater than 40 weight percent of the catalytic surface, such as no greater than about 30 weight percent.

Suitable preferred ferrites to be modified with silicon according to this invention are zinc ferrites having X-ray diffraction peaks within the $d$-spacings 4.83 to 4.89, 2.95 to 3.01, 2.51 to 2.57, 2.40 to 2.46, 2.08 to 2.14, 1.69 to 1.75, 1.59 to 1.65 and 1.46 to 1.52, with the most intense peak being between 2.95 to 3.01; magnesium ferrites having peaks between 4.80 to 4.86, 2.93 to 2.99, 2.49 to 2.55, 2.06 to 2.12, 1.68 to 1.73, 1.58 to 1.63 and 1.45 to 1.50 with the most intense peak being between 2.49 and 2.55; and nickel ferrites having peaks within the $d$-spacings of 4.79 to 4.85, 2.92 to 2.98, 2.48 to 2.54, 2.05 to 2.11, 1.57 to 1.63 and 1.44 to 1.49, with the most intense peak being within 2.48 to 2.54. The zinc ferrites will generally have peaks within the $d$-spacings 4.84 to 4.88, 2.96 to 3.00, 2.52 to 2.56, 2.41 to 2.45, 2.09 to 2.13, 1.70 to 1.74, 1.60 to 1.64 and 1.47 to 1.51. Similarly, the magnesium ferrites will generally have peaks within the $d$-spacings of 4.81 to 4.85, 2.93 to 2.98, 2.50 to 2.54, 2.07 to 2.11, 1.69 to 1.72, 1.59 to 1.62 and 1.46 to 1.49, with the most intense peak being within the range of 2.50 to 2.54. The nickel ferrites will generally have peaks within the $d$-spacings 4.80 to 4.84, 2.93 to 2.97, 2.50 to 2.53, 2.07 to 2.10, 1.59 to 1.61 and 1.46 to 1.49, with the most intense peaks being within 2.50 to 2.53.

Although excellent results are obtained with the catalysts of this invention with a feed containing only the hydrocarbon, oxygen and perhaps steam or a diluent, it is one of the advantages of this invention that halogen may also be added to the reaction gases to give excellent results. The addition of halogen to the feed is particularly effective when the hydrocarbons to be dehydrogenated is saturated.

The source of halogen fed to the dehydrogenation zone may be either elemental halogen or any compound of halogen which would liberate halogen under the conditions of reaction. Suitable sources of halogen are such as hydrogen iodide, hydrogen bromide and hydrogen chloride; aliphatic halides such as ethyl iodide, methyl bromide, 1,2-dibromo ethane, ethyl bromide, amyl bromide and allyl bromide; cycloaliphatic halides such as cyclohexylbromide; aromatic halides such as benzyl bromide; halohydrins such as ethylene bromohydrin; halogen substituted aliphatic acids such as bromoacetic acid; ammonium iodide; ammonium bromide; ammonium chloride; organic amine halide salts such as methyl amine hydrobromide; and the like. Mixtures of various sources of halogen may be used. The preferred sources of halogen are iodine, bromine and chlorine and compounds thereof such as hydrogen bromide, hydrogen iodide, hydrogen chloride, ammonium bromide, ammonium iodide, ammonium chloride, alkyl halides of one to six carbon atoms and mixtures thereof, with the iodine and bromine compounds being particularly preferred, and the best results having been obtained with ammonium iodide, bromide or chloride. When terms such as halogen liberating materials or halogen materials are used in the specification and claims, this includes any source of halogen such as elemental halogens, hydrogen halides or ammonium halides. The amount of halogen, calculated as elemental halogen, may be as little as about 0.0001 or less mol of halogen per mol of the hydrocarbon compound to be dehydrogenated to as high as 0.2 or 0.5 or higher. The preferred range is from about 0.001 to 0.09 mol of halogen per mol of the hydrocarbon to be dehydrogenated to as high as 0.2 or 0.5 or higher. The preferred range is from about 0.001 to 0.09 mol of halogen per mol of the hydrocarbon to be dehydrogenated.

Improved catalysts may be obtained by reducing the catalyst of the invention. The reduction of the catalyst may be accomplished prior to the initial dehydrogenation, or the catalyst may be reduced after the catalyst has been used. It has been found that a used catalyst may be regenerated by reduction, and, thus, even longer catalyst life obtained. The reduction may be accomplished with any gas which is capable of reducing iron oxide to a lower valence such as hydrogen, carbon monoxide or hydrocarbons. Generally the flow of oxygen will be stopped during the reduction step. In these reduced ferrites the catalysts may contain a lower amount of oxygen than the original ferrite. The temperature of reduction may be varied but the process is most economical at temperatures of at least about 200° C., with the upper limit being about 750° C. or 900° C. or even higher under certain conditions.

In the following examples will be found specific embodiments of the invention and details employed in the practice of the invention. Percent conversion refers to the mols of hydrocarbon consumed per 100 mols of hydrocarbon fed to the reactor, percent selectivity refers to the mols of product formed per 100 mols of hydrocarbon consumed, and percent yield refers to the mols of product formed per mol of hydrocarbon fed.

*Example*

A catalyst was prepared containing magnesium ferrite modified by silicon. 98 grams of Columbian Carbon magnesium ferrite, type EG–1, was slurried in 120 cc. of distilled water. The magnesium ferrite contained 18.7 to 19.2 weight percent magnesium calculated as MgO and had X-ray diffraction peaks at d-spacings within 4.81 to 4.85, 2.93 to 2.98, 2.50 to 2.54, 2.07 to 2.11, 1.69 to 1.72, 1.59 to 1.62, and 1.46 to 1.49, with the most intense peak falling within 2.50 to 2.54. 50 grams silica hydrogel prepared from the hydrolysis of ethyl silicate was added. The silica hydrogel contained the equivalent of 2 grams of $SiO_2$. A paste of these two components was slurried and dried at 140° C. in a cake ⅜ inch thick. The cake was then broken into granules and reacted in a muffle furnace at approximately 1100° C. for two hours. The catalyst was cooled from 1100° C. to room temperature in about 6 hours. The composition of the final product contained 2 weight percent silicon calculated as $SiO_2$. The dried hard cake from the muffle furnace was broken into granules and screened to select a 4 to 8 mesh fraction. 80 cc. of this fraction was mixed with 80 cc. of essentially inert alumina fused balls and placed in a reactor tube for testing. The reactor tube was a one inch diameter I.P.S. No. 316 stainless steel reactor. The length of the reactor tube was 20 inches. A hydrocarbon containing a minimum of 98 mol percent butene-2 was dehydrogenated. The reactor was brought to approximately 500° F. in air; then steam was introduced at a 30 to 1 steam to hydrocarbon ratio. The butene-2 was then added. The flow rate was 1.0 liquid hourly space velocity of butene-2. Oxygen was added as air in an amount equivalent to an average of 0.78 mol of oxygen per mol of butene-2. After 24 hours on stream, the inlet temperature was 850° F. with the maximum temperature in the reactor being 970° C. Under these conditions, the percent conversion was 73, the selectivity to butadiene-1,3 was 88 percent, for a 64 percent yield per pass. This run was continued for 1,019 hours (42 days) and, at that time, the conversion was 78 percent, the selectivity was 92 percent, for a yield of 72 percent butadiene-1,3. The inlet temperature was only 750° F. and the outlet temperature was 900° F.

When this example is repeated with catalysts comprising zinc ferrite, cobalt ferrite, and nickel ferrite containing from 1 to 10 weight percent silicon dioxide, equivalent results are obtained in the dehydrogenation of butene to butadiene and isopentene to isoprene.

I claim:

1. A process for the dehydrogenation of organic compounds having at least four carbon atoms which comprises contacting in the vapor phase at a temperature of greater than 250° C. a mixture of the said organic compound to be dehydrogenated and from 0.2 to 2.5 mols of oxygen per mol of the said organic compound with a catalyst for the dehydrogenation comprising iron, silicon and a metal selected from the group consisting of magnesium, zinc, cobalt, nickel and mixtures thereof wherein the silicon is present in an amount of from .003 to 0.30 atom of silicon per atom of iron and the atoms of magnesium, zinc, cobalt and nickel are present in a total amount of from .05 to 2 atoms per atom of iron.

2. A process for the dehydrogenation of aliphatic hydrocarbons having at least four carbon atoms which comprises contacting in the vapor phase at a temperature of greater than 250° C. a mixture of the said hydrocarbon to be dehydrogenated and from 0.2 to 2.5 mols of oxygen per mol of the said hydrocarbon, with a catalyst for the dehydrogenation comprising iron, silicon and a metal selected from the group consisting of magnesium, zinc, cobalt, nickel and mixtures thereof wherein the silicon is present in an amount of from .003 to 0.30 atom of silicon per atom of iron and the atoms of magnesium, zinc, cobalt and nickel are present in a total amount of from .05 to 2 atoms per atom of iron.

3. A process for the dehydrogenation of aliphatic hydrocarbons having a least four carbon atoms which comprises contacting in the vapor phase at a temperature of greater than 250° C. a mixture of the said hydrocarbon to be dehydrogenated and from 0.2 to 2.5 mols of oxygen per mol of the said hydrocarbon with a catalyst for the dehydrogenation comprising iron, silicon and a ferrite selected from the group consisting of magnesium ferrite, zinc ferrite, cobalt ferrite, nickel ferrite and mixtures thereof wherein the silicon is present in an amount of from .003 to 0.30 atom of silicon per atom of iron and the atoms of magnesium, zinc, cobalt and nickel are present in a total amount of from .2 to 1.0 atom per atom of iron.

4. A process for the dehydrogenation of a hydrocarbon selected from the group consisting of n-butene, n-butane, and mixtures thereof which comprises contacting in the vapor phase at a temperature of 300° C. to 625° C. a mixture of the said hydrocarbon to be dehydrogenated and from about 0.25 to about 1.6 mol of oxygen per mol of the said hydrocarbon with a catalyst for the dehydrogenation comprising magnesium ferrite and silicon in intimate combinations wherein the silicon is present in an amount from about .003 to 0.30 atom of silicon per atom of iron, the said magnesium ferrite having X-ray diffraction peaks and $d$ spacings within the ranges of 4.80 to 4.86, 2.93 to 2.99, 2.49 to 2.55, 2.06 to 2.12, 1.68 to 1.73, 1.58 to 1.63, and 1.45 to 1.50, with the most intense peak being between 2.49 to 2.55.

5. A process for the dehydrogenation of aliphatic hydrocarbons having at least four carbon atoms which comprises contacting in the vapor phase at a temperature of greater than 250° C. a mixture of the said hydrocarbon to be dehydrogenated and from 0.2 to 2.5 mols of oxygen per mole of the said hydrocarbon with a catalyst for the dehydrogenation comprising iron, silicon, and a metal selected from the group consisting of magnesium, zinc, cobalt, nickel and mixtures thereof wherein the silicon is present in an amount of from .003 to 0.30 atom of silicon per atom of iron and the atoms of magnesium, zinc, cobalt and nickel are present in a total amount of from .05 to 2 atoms per atom of iron and wherein the atoms of iron are present in an amount of about 40 to 90 weight percent of the said catalyst.

6. A process for the dehydrogenation of butene to butadiene-1,3 which comprises contacting in the vapor phase at a temperature of about 325° C. to 550° C. a mixture of the said butene with from 2 to 40 mols of steam per mol of butene and from 0.35 to 1.2 mols of oxygen per mol of the said butene with a catalyst for the dehydrogenation comprising magnesium ferrite and silicon wherein the silicon is present in an amount of from .004 to 0.20 atom of silicon per atom of iron and wherein the atoms of iron are present in an amount of about 40 to 90 weight percent of the said catalyst.

References Cited by the Examiner
UNITED STATES PATENTS

| | | | |
|---|---|---|---|
| 3,168,587 | 2/1965 | Michaels et al. | 260—683.3 |
| 3,179,707 | 4/1965 | Lee | 260—669 |
| 3,207,811 | 9/1965 | Bajars | 260—680 |

DELBERT E. GANTZ, *Primary Examiner.*

G. E. SCHMITKONS, *Assistant Examiner.*